(12) United States Patent
Shitara

(10) Patent No.: US 9,826,118 B2
(45) Date of Patent: Nov. 21, 2017

(54) IMAGE FORMATION APPARATUS

(71) Applicant: Oki Data Corporation, Tokyo (JP)

(72) Inventor: Ryou Shitara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/236,516

(22) Filed: Aug. 15, 2016

(65) Prior Publication Data

US 2017/0064137 A1    Mar. 2, 2017

(30) Foreign Application Priority Data

Aug. 27, 2015   (JP) ................................ 2015-168366

(51) Int. Cl.
| | |
|---|---|
| *H04N 1/03* | (2006.01) |
| *G06K 9/00* | (2006.01) |
| *H04N 1/387* | (2006.01) |
| *H04N 1/00* | (2006.01) |

(52) U.S. Cl.
CPC ....... *H04N 1/3878* (2013.01); *G06K 9/00463* (2013.01); *H04N 1/00721* (2013.01); *H04N 1/00724* (2013.01); *G06K 2209/01* (2013.01); *H04N 2201/0094* (2013.01)

(58) Field of Classification Search
CPC ............. H04N 1/3877; H04N 1/00721; H04N 1/6011; H04N 1/00567; H04N 1/0071; H04N 1/00713; H04N 1/00724; H04N 1/00737; H04N 1/00748; H04N 1/00758; H04N 1/00779; H04N 1/00795; H04N 1/00809; H04N 1/00

USPC ...... 358/452, 1.18, 296, 448, 462, 488, 527; 382/296, 292; 399/15, 376, 38, 408, 410, 399/81, 82; 715/209, 255, 273
See application file for complete search history.

(56) References Cited

U.S. PATENT DOCUMENTS

| | | | | |
|---|---|---|---|---|
| 5,033,104 A | * | 7/1991 | Amano ................. | G06K 9/346 358/1.9 |
| 5,461,459 A | * | 10/1995 | Muramatsu ........ | G03G 15/6544 358/448 |
| 5,508,810 A | * | 4/1996 | Sato ..................... | G06K 9/3208 358/296 |
| 5,875,035 A | * | 2/1999 | Motosugi ............. | H04N 1/6011 358/296 |

(Continued)

FOREIGN PATENT DOCUMENTS

JP          2011-010033 A      1/2011

*Primary Examiner* — Negussie Worku
(74) *Attorney, Agent, or Firm* — Metrolexis Law Group, PLLC

(57) ABSTRACT

An image formation apparatus includes: an image capturing device that reads an original document and generates image data of the original document; a color determiner that determines a color of a pixel of the image data; a blank line determiner that detects a blank line of the image data based on the color of the pixel determined by the color determiner; a parallel direction determiner that detects an extension direction of each of the character strings on the original document, based on the blank line; a character string area determiner that detects a start position and an end position of each of the character strings; and a orthogonal direction determiner that detects an orientation of the original document based on the start position and the end position.

18 Claims, 10 Drawing Sheets

(56) References Cited

U.S. PATENT DOCUMENTS

| | | | | |
|---|---|---|---|---|
| 5,960,248 | A * | 9/1999 | Ohno | G03G 15/6544 |
| | | | | 399/38 |
| 6,285,460 | B1 * | 9/2001 | Koh | H04N 1/32358 |
| | | | | 358/1.18 |
| 9,448,510 | B2 * | 9/2016 | Izumi | G03G 21/105 |
| 2001/0054335 | A1 * | 12/2001 | Harman | B25B 7/123 |
| | | | | 81/367 |
| 2009/0067724 | A1 * | 3/2009 | Hirohata | G03G 21/046 |
| | | | | 382/190 |
| 2009/0080783 | A1 * | 3/2009 | Hirohata | G06K 9/00577 |
| | | | | 382/218 |
| 2009/0097076 | A1 * | 4/2009 | Fujiwara | H04N 1/2038 |
| | | | | 358/448 |
| 2010/0290800 | A1 * | 11/2010 | Akiyama | G03G 15/0131 |
| | | | | 399/66 |
| 2010/0297076 | A1 * | 11/2010 | Morrison | A61K 38/212 |
| | | | | 424/85.6 |
| 2017/0064137 | A1 * | 3/2017 | Shitara | H04N 1/3878 |

* cited by examiner

Fig. 6A

| LATERAL LINE | 1 | 2 | 3 | 4 | 5 | ... |
|---|---|---|---|---|---|---|
| DETERMINATION | BLANK | BLANK | NON-BLANK | NON-BLANK | BLANK | ... |

Fig. 6B

| LONGITUDINAL LINE | 1 | 2 | 3 | 4 | 5 | ... |
|---|---|---|---|---|---|---|
| DETERMINATION | BLANK | NON-BLANK | NON-BLANK | NON-BLANK | NON-BLANK | ... |

Fig. 7

| BLANK LINE GROUP | 1 | 2 | 3 | 4 | 5 | POPULATION VARIANCE |
|---|---|---|---|---|---|---|
| LATERAL LINE | THE NUMBER OF BLANK LINES: 2 | THE NUMBER OF BLANK LINES: 3 | THE NUMBER OF BLANK LINES: 4 | THE NUMBER OF BLANK LINES: 3 | THE NUMBER OF BLANK LINES: 6 | 1.356466 |
| LONGITUDINAL LINE | THE NUMBER OF BLANK LINES: 1 | THE NUMBER OF BLANK LINES: 10 | -- | -- | -- | 4.5 |

Fig. 8

| LINE | START COORDINATE | END COORDINATE |
|---|---|---|
| 1 | 0 | 0 |
| 2 | 0 | 0 |
| 3 | 5 | 795 |
| 4 | 7 | 800 |
| 5 | 0 | 0 |
| 6 | 0 | 0 |
| 7 | 0 | 0 |
| 8 | 11 | 950 |
| 9 | 11 | 952 |
| 10 | 13 | 951 |
| 11 | 0 | 0 |
| 12 | 0 | 0 |
| 13 | 0 | 0 |
| 14 | 0 | 0 |
| 15 | 7 | 946 |
| 16 | 5 | 948 |
| 17 | 6 | 950 |
| 18 | 0 | 0 |
| 19 | 0 | 0 |
| 20 | 0 | 0 |
| 21 | 8 | 541 |
| 22 | 4 | 540 |
| 23 | 6 | 543 |
| 24 | 0 | 0 |
| 25 | 0 | 0 |
| 26 | 0 | 0 |
| 27 | 0 | 0 |
| 28 | 0 | 0 |
| 29 | 0 | 0 |
| 30 | 8 | 950 |
| 31 | 9 | 952 |
| 32 | 5 | 951 |
| 33 | 0 | 0 |
| 34 | 0 | 0 |
| 35 | 0 | 0 |
| ... | ... | ... |
| POPULATION VARIANCE | 2.584293 | 164.7854 |

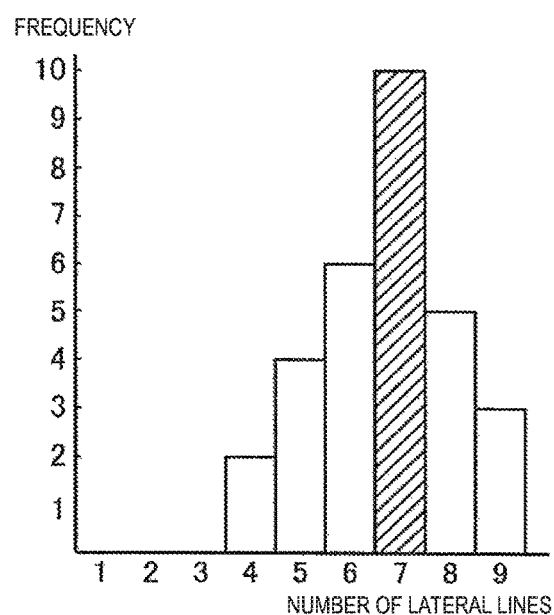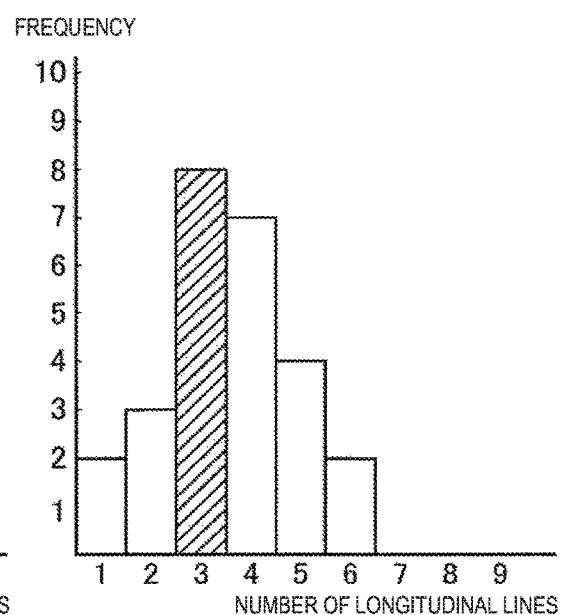
Fig. 12A
Fig. 12B

IMAGE FORMATION APPARATUS

CROSS REFERENCE TO RELATED APPLICATIONS

This application claims priority based on 35 USC 119 from prior Japanese Patent Application No. P2015-168366 filed on Aug. 27, 2015, entitled "IMAGE FORMATION APPARATUS", the entire contents of which are incorporated herein by reference.

BACKGROUND OF THE INVENTION

1. Field of the Invention

The disclosure relates to an image formation apparatus that determines the orientation of an original document based on an image data of a scanned original document.

2. Description of Related Art

In order to determine the orientation of an original document based on the image data of the scanned original document, a conventional image formation apparatus is configured to perform character recognition processing (pattern matching) on the image data of the scanned original document using an optical character recognition technique, and determine the orientation of the original document based on the ratio of the characters for each orientation (see Japanese Patent Application Publication No. 2011-10033, for example).

SUMMARY OF THE INVENTION

In the conventional technique, a character recognition processing using an optical character recognition technique requires a pattern dictionary to store information on character patterns to be superimposed for the matching. As a result, there is a problem that the orientation of an original document cannot be determined with a simple configuration not including the pattern dictionary, for example.

An object of an embodiment of the invention is to achieve the capability of determining the orientation of an original document with a simple configuration.

An aspect of the invention is an image formation apparatus that includes: an image capturing device that reads an original document and generates image data of the original document; a color determiner that determines a color of a pixel of the image data; a blank line determiner that detects a blank line of the image data based on the color of the pixel determined by the color determiner; a parallel direction determiner that detects an extension direction of a space between lines of character strings written on the original document, based on the blank line; a character string area determiner that detects a start position and an end position of each of the character strings; and a orthogonal direction determiner that detects an orientation of the original document based on the start position and the end position.

According to the aspect of the invention, an image formation apparatus with a simple configuration can determine the orientation of an original document.

BRIEF DESCRIPTION OF THE DRAWINGS

FIGS. 6A and 6B are each an explanatory diagram for the blank line detection results according to the first embodiment.

FIG. 7 is an explanatory diagram for a level of variation of the blank lines according to the first embodiment.

FIG. 8 is an explanatory diagram for a level of variation in a start coordinate and an end coordinate according to the first embodiment.

FIGS. 12A and 12B are each an explanatory diagram for the blank line detection results according to the second embodiment.

DETAILED DESCRIPTION OF EMBODIMENTS

Figure 1:
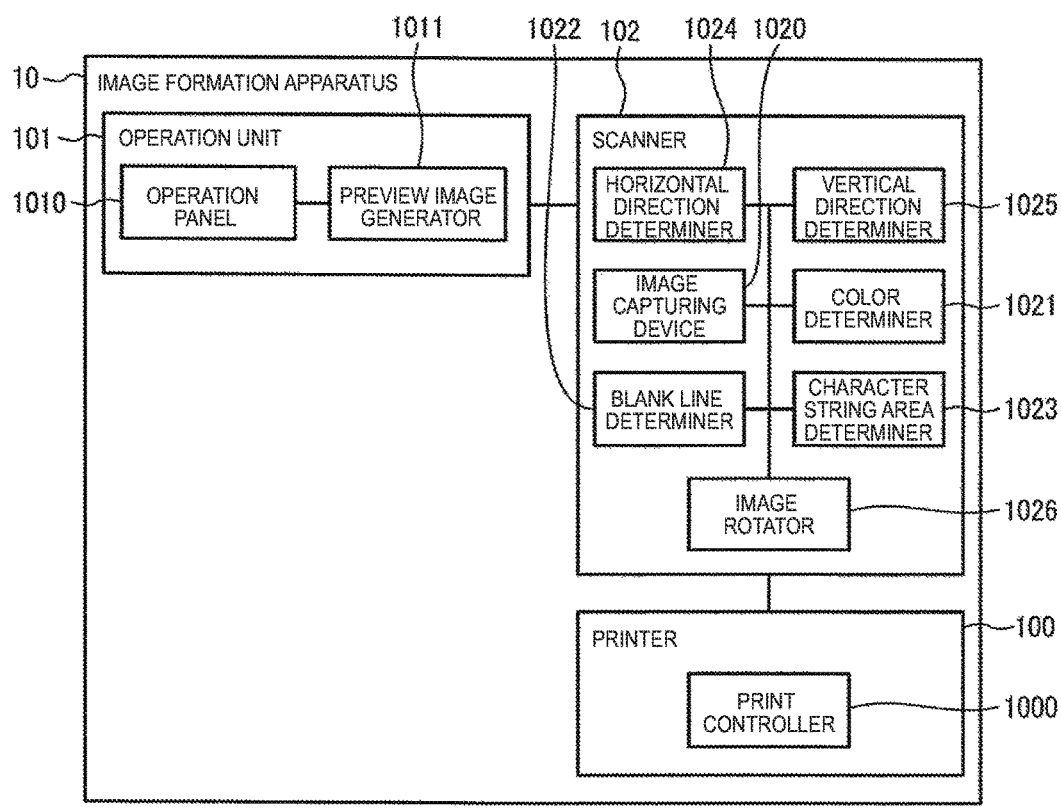
FIG. 1 is a block diagram illustrating a control configuration of an image formation apparatus according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

With reference to the drawings, descriptions are hereinafter provided for embodiments of an image formation apparatus according to the invention.

First Embodiment

Figure 2:
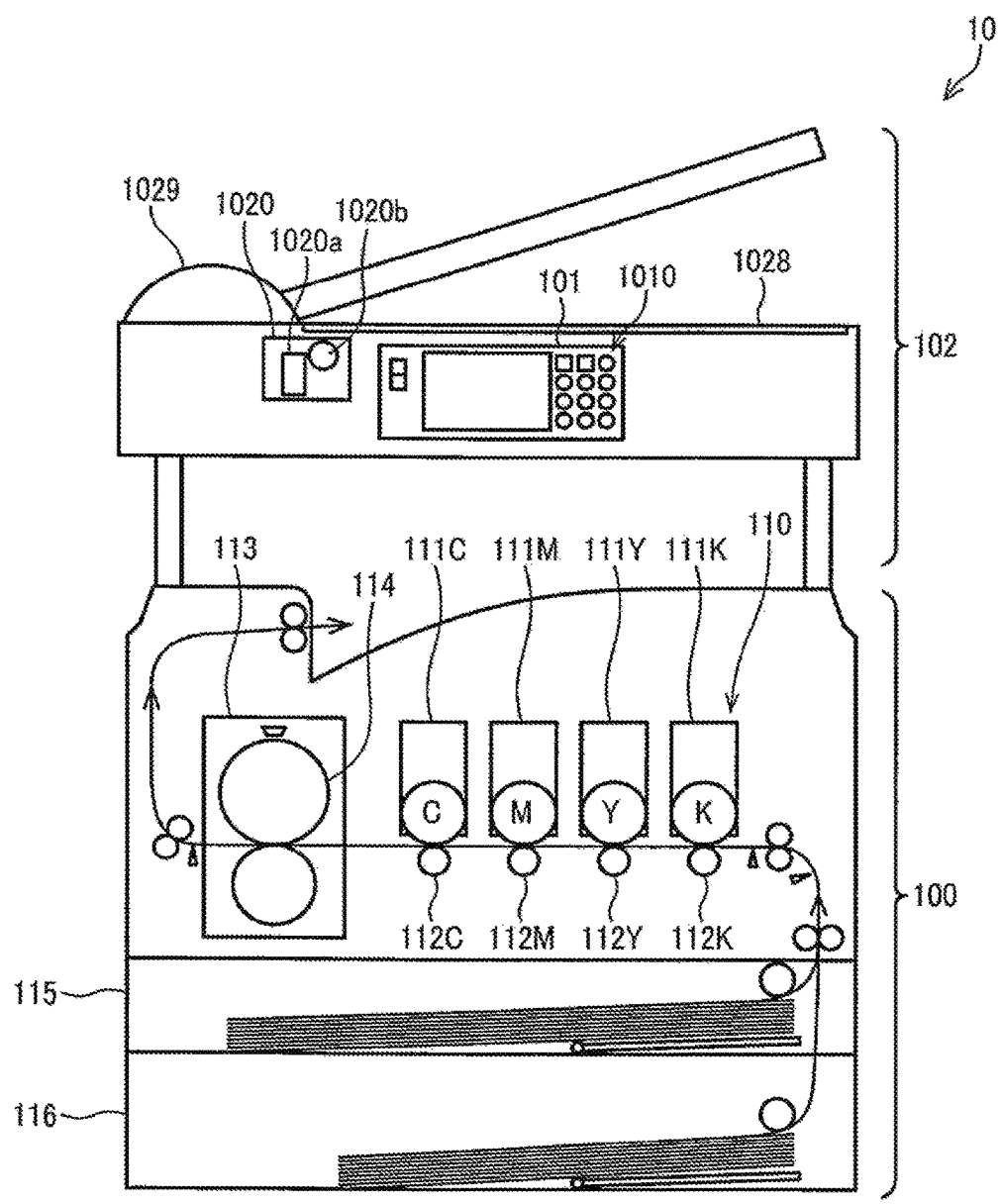
FIG. 2 is an explanatory diagram illustrating a configuration of the image formation apparatus according to the first embodiment.

FIG. 2 is an explanatory diagram illustrating a configuration of an image formation apparatus according to a first embodiment.

In FIG. 2, image formation apparatus 10 includes printer 100, operation unit 101, and scanner 102. Image formation apparatus 10 performs a copy job that prints on paper using printer 100, the image of an original document scanned by scanner 102, a print job that prints on paper in accordance with print data received from an external apparatus through a communication line, and other jobs.

Printer 100 includes image formation units 111 (111K, 111Y, 111M, 111C), fusion unit 113, and paper feeder trays 115 and 116.

Image formation units 111 (111K, 111Y, 111M, 111C) form toner images on photoreceptor drums as image carriers with toner as a developer of the respective colors (K: black, Y: yellow, M: magenta, C: cyan). The toner images formed on the photoreceptor drums are transferred on paper conveyed from paper feeder trays 115 and 116 with transfer rollers 112 (112K, 112Y, 112M, 112C).

Although in this embodiment, descriptions are provided assuming that image formation units 111 form the toner images of the colors of CMYK, image formation unit 111 for another color may be added besides CMYK, or one of image formation units 111 may be replaced with image formation unit 111 for a spot color such as a transparent toner.

Fusion unit 113 fuses the toner transferred on the paper with heat from heater 114. The paper on which the toner is fused is conveyed by a conveyor and discharged to the outside of the apparatus.

Paper feeder trays 115 and 116 are trays for storing paper for printing and are capable of storing a different size of paper in each tray or storing paper in a different orientation.

As described above, printer 100 includes image formation units 111, fusion unit 113, paper feeder trays 115 and 116, and other units, and prints by forming an image on paper.

Operation unit 101 includes operation panel 1010 provided with a display unit to display various information and an input unit to receive user operation. Operation panel 1010 includes hard keys, a touch panel, and other components.

Scanner 102 includes image capturing device 1020 or a scanning device that reads or captures the image of the original document and generates the image data, original document placement table 1028 or a platen, and automatic document feeder (ADF) 1029.

Image capturing device 1020 includes light source 1020*a* that emits light to the original document to obtain a reflection of the image of the original document, and charge coupled device (CCD) unit 1020*b* that reads the reflection and generates the image data. Image capturing device 1020 generates the image data of the original document by generating lines in a sub-scan direction, each including a line of image data in a main scan direction.

Original document placement table 1028 or a platen is where the original document is placed. From the original document placed on original document placement table 1028, an image is captured by image capturing device 1020 that moves in the sub-scan direction.

ADF 1029, which is an automatic document feeder for original documents, feeds placed original documents one by one, sending each document to image capturing device 1020. From the fed original document, an image is captured by image capturing device 1020.

FIG. 1 is a block diagram illustrating a control configuration of the image formation apparatus according to the first embodiment.

In FIG. 1, image formation apparatus 10 includes printer 100, operation unit 101, and scanner 102.

Printer 100 as a printer section, which forms an image on a medium, includes print controller 1000.

Print controller 1000 controls image formation units 111, fusion unit 113, paper feeder trays 115 and 116, and other units illustrated in FIG. 2 described above, and forms an image on paper to perform the printing.

Operation unit 101 includes the display unit to display information and the input unit to receive input operation. Operation unit 101 includes operation panel 1010 described above and preview image generator 1011. Operation unit 101 is operated by the user, and includes operation panel 1010 as the input unit that receives input operation indicating instructions for image formation apparatus 10, and as the display unit that displays guides for the input operation, states of jobs being performed, the preview of a scanned image, and other information.

Preview image generator 1011 generates a preview image by scaling down the image of the original document captured by image capturing device 1020, and displays the generated preview image on operation panel 1010.

Scanner 102 serving as a scanner section, which captures the image of the original document, includes image capturing device 1020 or a scanning device illustrated in FIG. 2, color determiner 1021, blank line determiner 1022, character string area determiner 1023, horizontal direction determiner 1024, vertical direction determiner 1025, and image rotator 1026.

Image capturing device 1020 captures the original document, and generates the image data of the original document.

Color determiner 1021 determines the colors (RGB color) of the pixels of the image data of the original document captured by image capturing device 1020.

Blank line determiner 1022 as a blank line determiner determines whether or not the lines of pixels in the X-direction (sub-scan direction, for example) and the Y-direction (main scan direction, for example) of the image data are blank lines based on the colors of the pixels determined by color determiner 1021, and detects blank lines. Blank line determiner 1022 determines that a line in which only the pixels determined by color determiner 1021 to be white is a blank line or determines that a line is a blank line by regarding an area, in which pixels of different multiple colors are detected continuously, as white even though those pixels are not white. In the above manner, blank line determiner 1022 determines whether or not each line of pixels of the captured image data in the X-direction and in the Y-direction is a blank line. Note that in this embodiment, the X-direction is referred to as a lateral direction, and the Y-direction is referred to as a longitudinal direction.

Horizontal direction determiner 1024 serving as a parallel direction determiner detects, based on the blank lines detected by blank line determiner 1022, an extension direction of a space between lines that are in parallel with character strings in the original document. Horizontal direction determiner 1024 checks in which of the lateral direction and the longitudinal direction the lines determined to be blank lines by blank line determiner 1022 continue, and determines that the direction of the continuity is the direction in which lines of character strings extend. Note that in this embodiment, the direction in which lines of character strings extend is referred to as a horizontal direction.

Character string area determiner 1023 detects a start position and an end position of a character string. This character string area determiner 1023 determines that a line is a character string line if only pixels of a single color or a white color are detected in the line by color determiner 1021 in the direction in which the line space between adjacent character strings determined by horizontal direction determiner 1024 extend. Then, character string area determiner 1023 detects the start coordinate of a character area in the character string line as the start position and the end coordinate as the end position. Note that in this embodiment, the coordinate is a position of a pixel from one end of image data (from the left end, for example).

Vertical direction determiner 1025 serving as an orthogonal direction determiner detects the orientation of the original document based on the start position and the end position of the character string detected by character string area determiner 1023. This vertical direction determiner 1025 calculates a level of variation in the start coordinate and the end coordinate detected by character string area determiner 1023 and determines that the coordinates having a lower level of variation and more constant positions indicate the end where character strings start. Note that in this embodiment, the direction orthogonal to the extension direction of the line space between the adjacent character strings is referred to as a vertical direction.

Image rotator 1026 rotates the image data of the original document generated by image capturing device 1020, based on the extension direction of the lines of the character strings detected by horizontal direction determiner 1024 and the orientation of the original document detected by vertical direction determiner 1025. This image rotator 1026 rotates the image data in accordance with the direction and the angle determined by horizontal direction determiner 1024 and vertical direction determiner 1025.

The image formation apparatus thus configured performs original document orientation determination processing that determines the orientation of the original document based on the image data of the original document captured by scanner 102.

Note that print controller 1000, preview image generator 1011, image color determiner 1021, blank line determiner 1022, character string area determiner 1023, horizontal direction determiner 1024, vertical direction determiner 1025, image rotator 1026, and the like in image formation apparatus 100 are implemented such that, for example, a circuitry such as one or more central processing units (CPUs) or processors provided in image formation apparatus 10 executes a predetermined program(s).

A description is next provided for the operation of the configuration described above.

Figure 3:
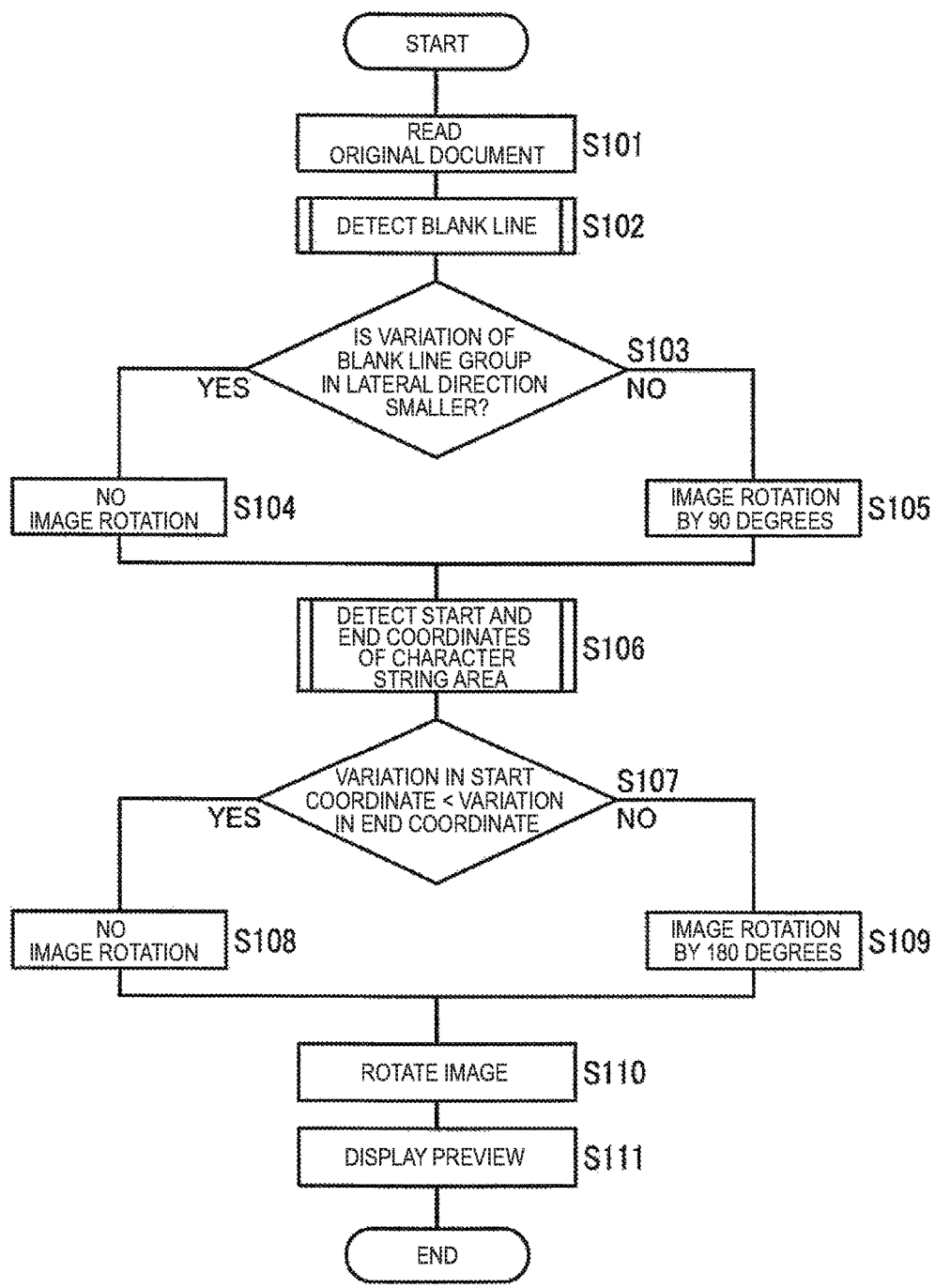
FIG. 3 is a flowchart illustrating a procedure of the original document orientation determination processing according to the first embodiment.

The original document orientation determination processing performed by the image formation apparatus is described referring to FIGS. 1 and 2, following the steps indicated by characters S in the flowchart in FIG. 3 illustrating the procedure of the original document orientation determination processing according to the first embodiment.

First, the user places an original document on which characters are written on original document placement table 1028 or ADF 1029 of scanner 102 of image formation apparatus 10 and operates operation unit 101 to start scanning the original document. Accordingly, image formation apparatus 10 starts scanning the original document.

Note that in this embodiment, a description is provided assuming that the original document to be scanned is a horizontally written document in which character strings are arranged extending in the lateral direction. This is because the original documents are generally horizontally written documents in many cases.

S101: Image capturing device 1020 of scanner 102 scans (captures) the original document and generates the image data of the original document.

S102: Color determiner 1021 determines the colors of pixels of the image data of the original document scanned by image capturing device 1020. Blank line determiner 1022 performs blank line detection processing that detects blank lines in both the longitudinal and lateral directions of the image data by determining whether or not a blank line is present based on the colors determined by color determiner 1021.

For example, blank line determiner 1022 performs a blank line detection as indicated in FIGS. 6A and 6B. FIG. 6A indicates determination results of the lateral lines that lines 1, 2, and 5 are blank, and lines 3 and 4 are non-blank.

Note that details of the blank line detection processing are described later.

S103: Horizontal direction determiner 1024 obtains a variation in the number of blank lines that appear continuously (the number of lines in a blank line group) in both the longitudinal and lateral directions and compares the variation in the lateral direction and the variation in the longitudinal direction. If horizontal direction determiner 1024 determines that the variation in the lateral direction is smaller than the variation in the longitudinal direction, it moves the processing to S104 because no rotation of the image data is necessary. If it determines that the variation in the longitudinal direction is smaller than or equal to the variation in the lateral direction, it moves the processing to S105 to rotate the image data.

For example, as illustrated in FIG. 7, horizontal direction determiner 1024 calculates as follows. In the case where there are five blank line groups in the lateral lines and the numbers of blank lines are 2, 3, 4, 3, and 6, the population variance is 1.356466. In the case where there are two blank line groups in the longitudinal lines, on the other hand, and the numbers of blank lines are 1 and 10, the population variance is 4.5. In this case, horizontal direction determiner 1024 determines that the population variance of the lateral lines are smaller than that of the longitudinal lines, or in other words, the variation in the lateral direction is smaller than that in the longitudinal direction, and detects that the extension direction of the line spaces between the adjacent character strings (character string direction) is the lateral direction.

As described above, horizontal direction determiner 1024 detects the extension direction of the line spaces between the adjacent character strings based on the level of variation in the number of blank lines that continue (the number of lines in a blank line group).

S104: Horizontal direction determiner 1024, which has determined that the variation in the lateral direction is smaller, takes it that no rotation of the image data is necessary because the direction of character strings is horizontal, and moves the processing to S106.

S105: Horizontal direction determiner 1024, which has determined that the variation in the longitudinal direction is smaller, takes it that rotating the image data by 90 degrees (clockwise 90 degrees, for example) is necessary because the direction of character strings is vertical, and moves the processing to S106. Note that in this embodiment, the image data is temporarily rotated by 90 degrees by image rotator 1026 in order to perform a character string area detection processing to be described later.

Figure 9:
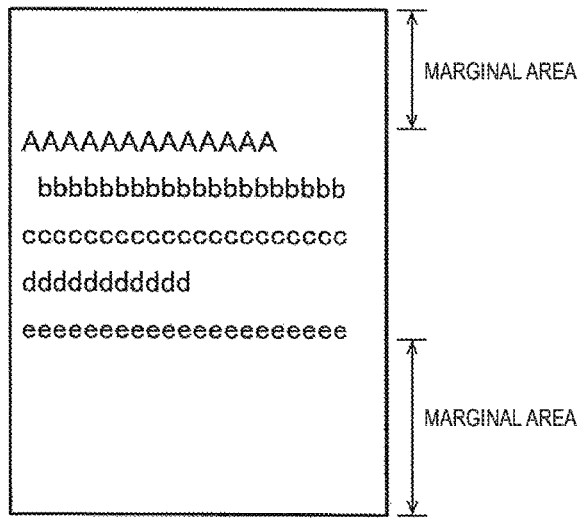
FIG. 9 is an explanatory diagram for an original document according to the first embodiment.

In this embodiment, the population variance is used to obtain levels of variation in determining the variation at S103. Note that another method other than the population variance may be used as long as the method is capable of determining the variation. In addition, as illustrated in FIG. 9, the first group and the last group in the blank line groups are often simply the marginal areas. Accordingly, in order to exclude the marginal areas, areas in which the number of blank lines is much larger (for example, larger by a predetermined number) than the average among the blank line groups are excluded from the groups the variations of which are to be checked. Moreover, in the case where one of the population parameters in the lateral direction and the longitudinal direction used to determine the variation is very small, it is determined that an error occurred in the detection and thus the variation is corrected to be large.

S106: Character string area determiner 1023 performs the character string area detection processing that detects the start coordinates and the end coordinates of the character strings in the extension direction of the lines of the character strings obtained by blank line determiner 1022 at S102.

S107: Vertical direction determiner 1025 obtains the variation in each of the start coordinate and the end coordinate detected by character string area determiner 1023. If vertical direction determiner 1025 determines that the variation in the start coordinate is smaller than the variation in the end coordinate, it moves the processing to S108. If it determines that the variation in the start coordinate is larger than or equal to the variation in the end coordinate, it moves the processing to S109.

For example, as illustrated in FIG. 8, vertical direction determiner 1025 obtains a population variance of each of the start coordinates and the end coordinates detected by character string area determiner 1023. In the case where the population variance of the start coordinates is 2.584293, and the population variance of the end coordinates is 164.7854, vertical direction determiner 1025 determines that the variation in the start coordinate is smaller than that of the end coordinate.

Note that although in this embodiment, the population variance is used to obtain the level of variation as with the case of determining the variation at S103, another method other than the population variance may be used as long as the method is capable of determining the variation.

S180: Vertical direction determiner 1025, which has determined that the variation in the start coordinate is smaller than the variation in the end coordinate, takes it that no rotation of the image data is necessary because the start coordinates are on the start side of character strings (left side, for example), and moves the processing to S110.

S109: Vertical direction determiner 1025, which has determined that the variation in the start coordinate is larger than or equal to the variation in the end coordinate, takes it that rotating the image data by 180 degrees is necessary because the end coordinates are on the start side of the character strings (on the left side, for example), and moves the processing to S110.

As described above, vertical direction determiner 1025 detects the orientation of the original document based on the levels of variation in the start position and the end position as detected by character string area determiner 1023.

S110: Image rotator 1026 rotates (rotates clockwise, for example) the image data scanned by image capturing device 1020 in accordance with the total angle of the angles determined at S104, S105, S108, and S109 by horizontal direction determiner 1024 and vertical direction determiner 1025.

S111: Preview image generator 1011 of operation unit 101 displays the image data rotated by image rotator 1026 on operation panel 1010 as a preview image to allow the user to check if the orientation is correct, and terminates the processing.

Figure 4:
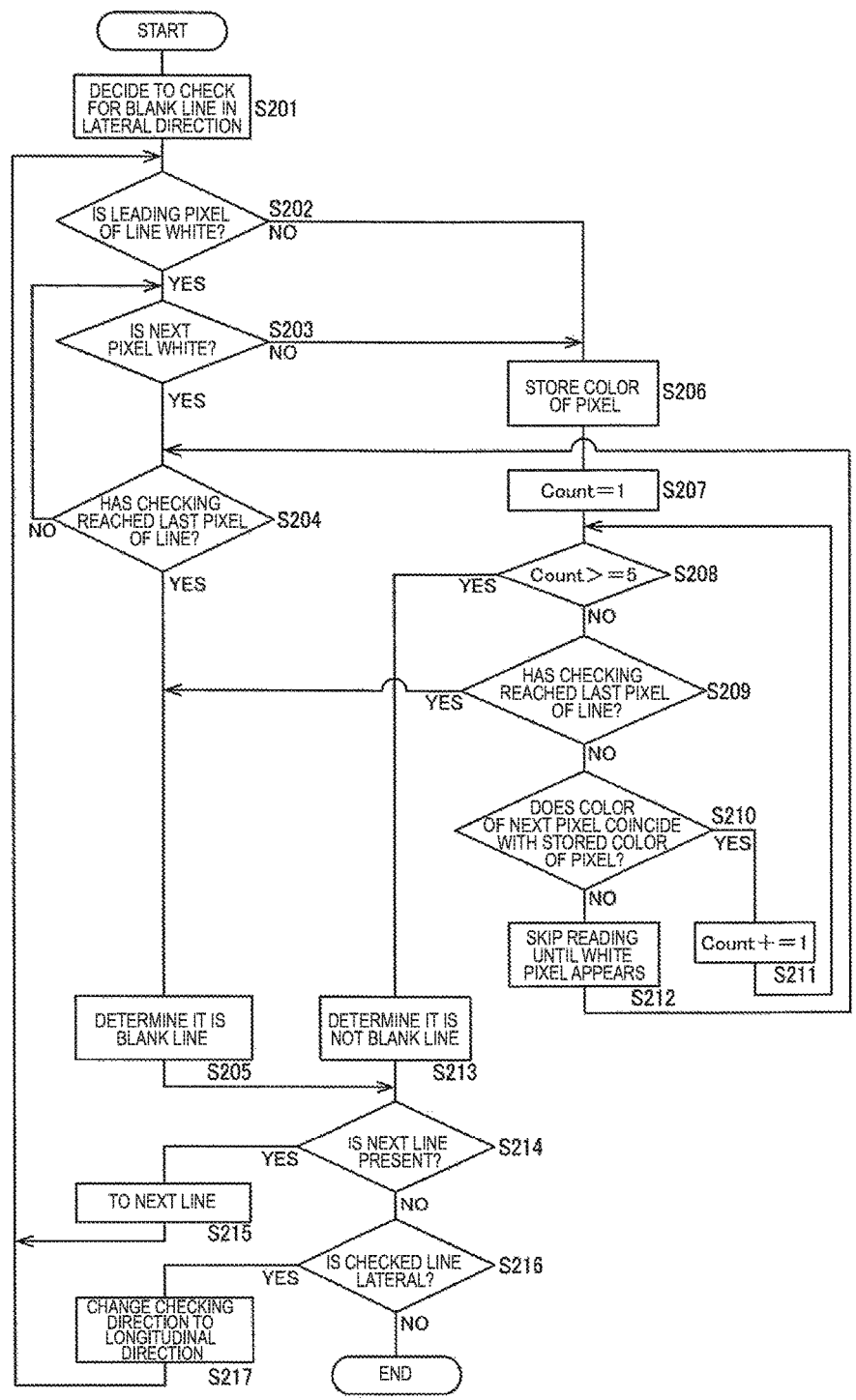
FIG. 4 is a flowchart illustrating a procedure of the blank line detection processing according to the first embodiment.

Next, the blank line detection processing performed by the blank line determiner is described referring to FIGS. 1 and 2, following steps indicated by characters S in the flowchart in FIG. 4 illustrating the procedure of the blank line detection processing according to the first embodiment. Note that this blank line detection processing is the processing performed at S102 in FIG. 3.

S201: Blank line determiner 1022 decides to check the image data in the lateral direction (direction from the pixels at the left end to the pixels at the right end of the image data, for example) in order to check whether or not a blank line is present in the image data of the original document scanned by image capturing device 1020.

S202: Blank line determiner 1022 determines whether or not the leading pixel of a line of the image data is white. If blank line determiner 1022 determines that the leading pixel of the line is white, it moves the processing to S203, and if it determines that the leading pixel is not white, it moves the processing to S206.

S203: Blank line determiner 1022 determines whether or not the next pixel is white. If blank line determiner 1022 determines that the next pixel is white, it moves the processing to S204, and if it determines that the next pixel is not white, it moves the processing to S206.

S204: Blank line determiner 1022 determines whether or not the checking has reached the last pixel of the line. If blank line determiner 1022 determines that the checking has reached the last pixel, it moves the processing to S205, and if it determines that the checking has not reached the last pixel, it moves the processing to S203 to check the next pixel.

S205: Blank line determiner 1022, which has determined that the checking has reached the last pixel, determines that the line is a blank line, stores the result in a storage, and moves the processing to S214.

As described above, blank line determiner 1022 determines that a pixel line is a blank line when (1) only pixels determined to be white by color determiner 1021 are lined, or (2) the pixel line is formed of pixels the color of which has been determined not to be white by color determiner 1021 and the pixels of the color are not lined continuously over a predetermined number.

S206: Meanwhile, blank line determiner 1022, which has determined that the pixel is not white at S202 and S203, stores the color of the pixel in the storage temporarily.

S207: Blank line determiner 1022 initializes the variable Count to "1".

S208: Blank line determiner 1022 determines whether or not the variable Count has become larger than or equal to 5. If blank line determiner 1022 determines that the variable Count has become larger than or equal to 5, it takes it that a character string has been detected, and moves the processing to S213 If it determines variable Count is smaller than 5, it moves the processing to S209.

S209: Blank line determiner 1022, which has determined that the variable Count is smaller than 5, determines whether or not the checking has reached the last pixel of the line. If blank line determiner 1022 determines that the checking has reached the last pixel, it moves the processing to S205 to determine that the line is a blank line, and if it determines that the checking has not reached the last pixel, it moves the processing to S210 to check the next pixel.

S210: Blank line determiner 1022 checks the color of the next pixel and determines whether or not the color of the next pixel coincides with the color of the previous pixel stored temporarily in the storage. If blank line determiner 1022 determines that both colors coincide, it moves the processing to S211, and if it determines that both colors do not coincide, it moves the processing to S212.

S211: Blank line determiner 1022, which has determined that the color of the checked pixel coincides with the color of the previous pixel, adds "1" to the variable Count and moves the processing to S208.

S212: Blank line determiner 1022, which has determined that the color of the checked pixel does not coincide with the color of the previous pixel, skips reading pixels of the image data until a white pixel appears, and returns the processing to S204.

S213: Blank line determiner 1022, which has determined at S208 that the variable Count has become larger than or equal to 5, judges that a character string area has been detected, determines that the line is not a blank line, and stores the result in the storage.

S214: Blank line determiner 1022, which has completed the determination for the one line, determines whether or not the next line is present. If blank line determiner 1022 determines that the next line is present, it moves the processing to S215, and if it determines that the next line is not present, it moves the processing to S216.

S215: Blank line determiner 1022, which has determined that the next line is present, sets the next line as the check target line and returns the processing to S202.

S216: Blank line determiner 1022, which has determined that the next line is not present, determines whether or not the checked line is oriented in the lateral direction. If blank line determiner 1022 determines that the checked line is oriented in the lateral direction, it moves the processing to S217 to check the lines in the longitudinal direction. If it determines that the checked line is not oriented in the lateral direction, or in other words, that the check line is oriented in the longitudinal direction, it terminates this processing.

S217: Blank line determiner 1022, which has determined that the checked line is oriented in the lateral direction, changes the direction of lines of the image data for checking to the longitudinal direction, and returns the processing to S202.

As described above, blank line determiner 1022 detects whether or not a blank line is present in the image data of the original document in the lateral and longitudinal directions.

Figure 10:
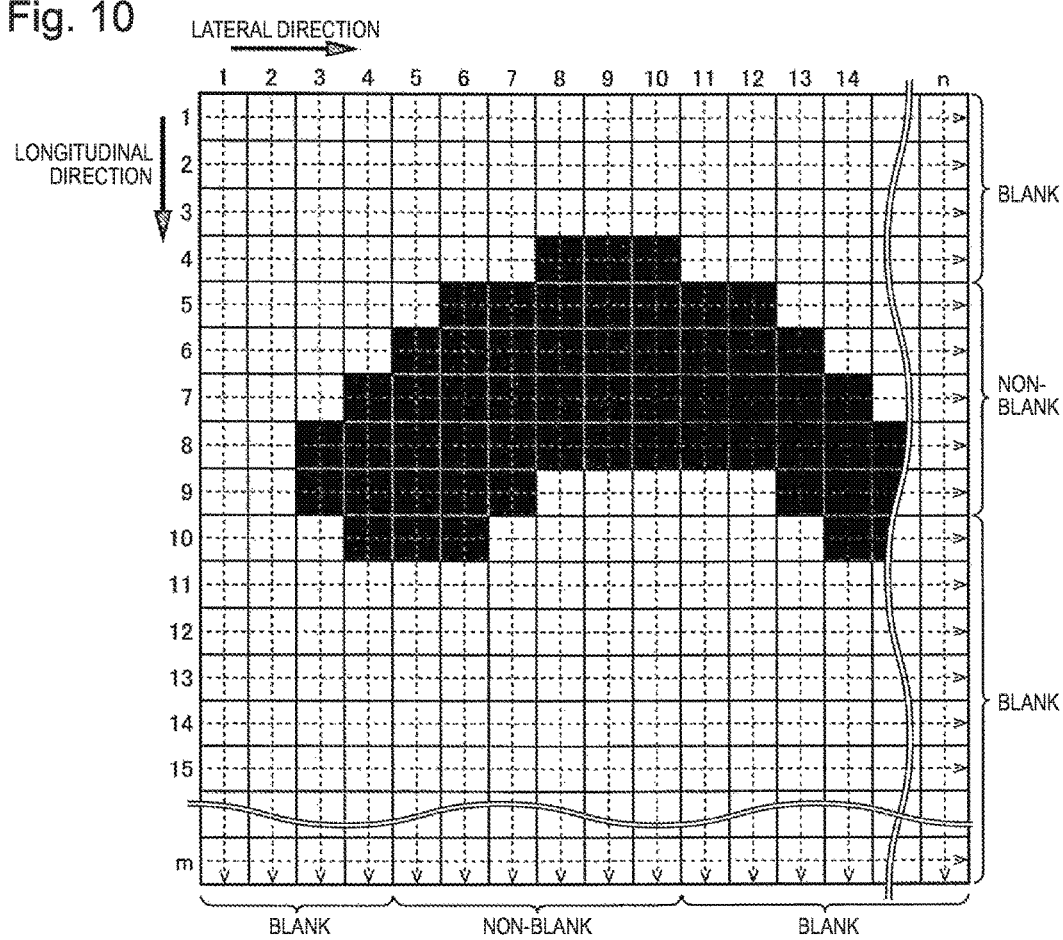
FIG. 10 is an explanatory diagram for the original document orientation determination processing according to the first embodiment.

For example, in the case of the image data of an original document as illustrated in FIG. 10, of the lines extending in the lateral direction, blank line determiner 1022 determines that lines 1 to 4 and lines 10 to 15 are blank lines and determines that lines 5 to 9 are non-blank lines. Of the lines extending in the longitudinal direction, blank line determiner 1022 determines that lines 1 to 4 and lines 11 to 14 are blank lines and determines that lines 5 to 10 are non-blank lines.

Note that although blank line determiner 1022 is configured to determine at S208 whether or not the variable Count has become larger than or equal to 5 as a threshold, the threshold is not limited to "5". If the character size is small, the number of lined pixels of a single color is small, or if the character size is large, the number of lined pixels of a single color is large. Hence, it is possible to improve the accuracy in the blank line detection by replacing the threshold with an optimum one depending on the environment where the characters are used. In addition, it is possible to improve the accuracy in the blank line detection by replacing the threshold with an optimum one depending on the resolution for scanning an original document, such as by increasing the threshold if the resolution of image capturing device 1020 for scanning an original document is high, or by decreasing the threshold if the resolution is low.

Moreover, since blank line determiner 1022 is configured to skip reading pixels of the image data until a white pixel appears at S212, it is possible to detect a blank line by ignoring an area where multiple colors are used in an original document, such as an image picture.

Figure 5:
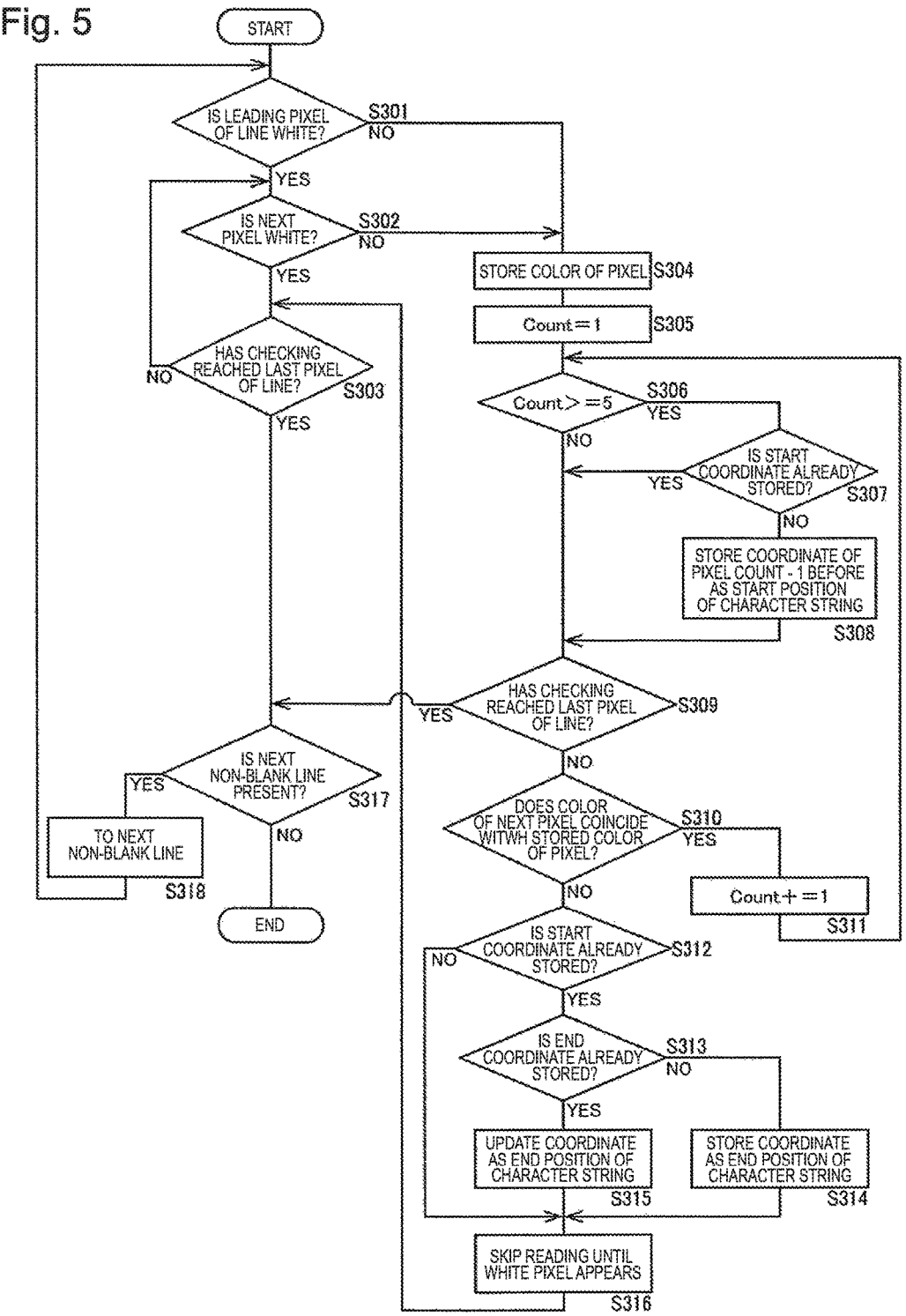
FIG. 5 is a flowchart illustrating a procedure of the character string area detection processing according to the first embodiment.

Next, the character string area detection processing performed by the character string area determiner is described referring to FIGS. 1 and 2, following the steps indicated by characters S in the flowchart in FIG. 5 illustrating the procedure of the character string area detection processing according to the first embodiment. Note that this character string area detection processing is the processing performed at S106 in FIG. 3. Note that the direction in which the image data are checked is also the lateral direction in this processing (the direction from pixels at the left end to pixels at the right end of the image data, for example).

S301: Character string area determiner 1023 determines whether or not the leading pixel of a line of the image data of the original document scanned by image capturing device 1020 is white. If character string area determiner 1023 determines that the leading pixel of the line is white, it moves the processing to S302, and if it determines that the leading pixel is not white, it moves the processing to S304.

S302: Character string area determiner 1023 determines whether or not the next pixel is white. If character string area determiner 1023 determines that the next pixel is white, it moves the processing to S303, and if it determines that the next pixel is not white, it moves the processing to S304.

S303: Character string area determiner 1023 determines whether or not the checking has reached the last pixel of the line. If character string area determiner 1023 determines that the checking has reached the last pixel, it moves the processing to S317, and if it determines that the checking has not reached the last pixel, it moves the processing to S302 to check the next pixel.

S304: Meanwhile, character string area determiner 1023, which has determined that the pixel is not white at S301 or S302, stores the color of the pixel in the storage temporarily.

S305: Character string area determiner 1023 initializes the variable Count to "1".

S306: Character string area determiner 1023 determines whether or not the variable Count has become larger than or equal to 5. If character string area determiner 1023 determines that the variable Count has become larger than or equal to 5, it takes it that a character string area is detected, and moves the processing to S307, and if it determines variable Count is smaller than 5, it moves the processing to S309.

S307: Character string area determiner 1023, which has determined that the variable Count has become larger than or equal to 5, is able to judge that a start of a character string has been detected, and determines whether or not the start coordinate of the character string is already stored in the storage. If character string area determiner 1023 determines that the start coordinate is stored, it moves the processing to S309, and if it determines that the start coordinate is not stored, it moves the processing to S308.

S308: Character string area determiner 1023, which has determined that the start coordinate of the character string in not stored in the storage, stores in the storage the position of the pixel the value "variable Count—1" before the present pixel as the start coordinate of the character string.

As described above, character string area determiner 1023 determines that the leading pixel of a pixel line is the start position of the character string if the pixel line is made of pixels the color of which has been determined not to be white by color determiner 1021, and pixels of the color are lined continuously over a predetermined number in the pixel line.

S309: Character string area determiner 1023 determines whether or not the checking has reached the last pixel of the line. If character string area determiner 1023 determines that the checking has reached the last pixel, it moves the processing to S317, and if it determines that the checking has not reached the last pixel, it moves the processing to S310 to check the next pixel.

S310: Character string area determiner 1023 checks the color of the next pixel and determines whether or not the color of the next pixel coincides with the color of the previous pixel stored temporarily in the storage. If character string area determiner 1023 determines that both colors coincide, it moves the processing to S311, and if it determines that both colors do not coincide, it moves the processing to S312.

S311: Character string area determiner 1023, which has determined that the color of the checked pixel coincides with the color of the previous pixel, adds "1" to the variable Count and moves the processing to S306.

S312: Character string area determiner 1023 determines whether or not the start coordinate of the character string is already stored in the storage. If character string area determiner 1023 determines that the start coordinate is stored, it moves the processing to S313, and if it determines that the start coordinate is not stored, it moves the processing to S316.

S313: Character string area determiner 1023, which has determined that the start coordinate of the character string is already stored in the storage, determines whether or not the end coordinate of the character string is already stored in the storage. If character string area determiner 1023 determines that the end coordinate is stored, it moves the processing to S315, and if it determines that the end coordinate is not stored, it moves the processing to S314.

S314: Character string area determiner 1023, which has determined that the end coordinate of the character string is not stored in the storage, stores the position of the present pixel in the storage as the end coordinate of the character string, and moves the processing to S316.

S315: Character string area determiner 1023, which has determined that the end coordinate of the character string is stored in the storage, updates the end coordinate of the character string stored in the storage to the position of the present pixel, and moves the processing to S316.

As described above, after character string area determiner 1023 detects the start position of a character string and when detecting a pixel in a color different from that of pixels of the character string, character string area determiner 1023 determines that the last pixel of the character string is the end position of the character string.

S316: Character string area determiner 1023, which has determined at S312 that the start coordinate of the character string is not stored in the storage, or which has stored or updated the end coordinate of the character string at S314 or S315, skips reading pixels of the image data until a white pixel appears, and returns the processing to S303.

S317: Character string area determiner 1023, which has determined that the checking has reached the last pixel of the line at S303 or S309, determines whether or not a non-blank line is still present. If character string area determiner 1023 determines that a non-blank line is present, it moves the processing to S318, and if it determines that a non-blank line is not present, it terminates the processing.

S318: Character string area determiner 1023 updates the check target line to the next non-blank line to check the next non-blank line, and returns the processing to S301.

In the manner described above, character string area determiner 1023 detects the start coordinate and the end coordinate in a character string direction of the image data of the original document.

For example, in the case of the image data of the original document illustrated in FIG. 10, character string area determiner 1023 detects the start coordinate of line 5 in the longitudinal direction as "6" and the end coordinate thereof as "12", and the start coordinate of line 6 as "5" and the end coordinate thereof as "13".

Note that although in this embodiment, character string area determiner 1023 detects start coordinates and end coordinates with respect to the pixels at the left end of the image data, it may detect the end coordinates with respect to the pixels at the right end of the image data.

As described above, in this embodiment, using only color information on the image data of the original document scanned by image capturing device 1020, blank line determiner 1022 decides the lateral (horizontal) direction of the original document by detecting the extension direction of blank lines in the image data of the original document, and character string area determiner 1023 decides the longitudinal (vertical) direction of the original document by detecting the start positions and the end positions of character strings in the extension direction of the blank lines. Thus, it is possible to automatically determine the orientation of the original document scanned by image capturing device 1020.

Therefore, image formation apparatus 10 is capable of automatically determining the orientation of an original document scanned by the image capturing device, even if it does not have a pattern dictionary.

In addition, image formation apparatus 10 is capable of rotating the image data of the original document scanned by image capturing device 1020 to be in the right orientation.

As has been described above, in the first embodiment, since the lateral (horizontal) direction of the original document is decided by detecting the extension direction of blank lines in the image data of the original document, and the longitudinal (vertical) direction of the original document is decided by detecting the start positions and the end positions of the character strings in the extension direction of blank lines, the effect can be obtained which makes it possible without a pattern dictionary to automatically determine the orientation of an original document scanned by the image capturing device.

Second Embodiment

In the original document orientation determination processing performed by an image formation apparatus, a second embodiment is different from the first embodiment in that the image formation apparatus is configured to receive an input operation indicating whether the character strings written on an original document are horizontally written or vertically written before scanning the original document.

Note that constituents in the second embodiment are the same as those in the first embodiment described above and are denoted by the same reference signs. Accordingly, descriptions thereof are omitted.

Figure 11:
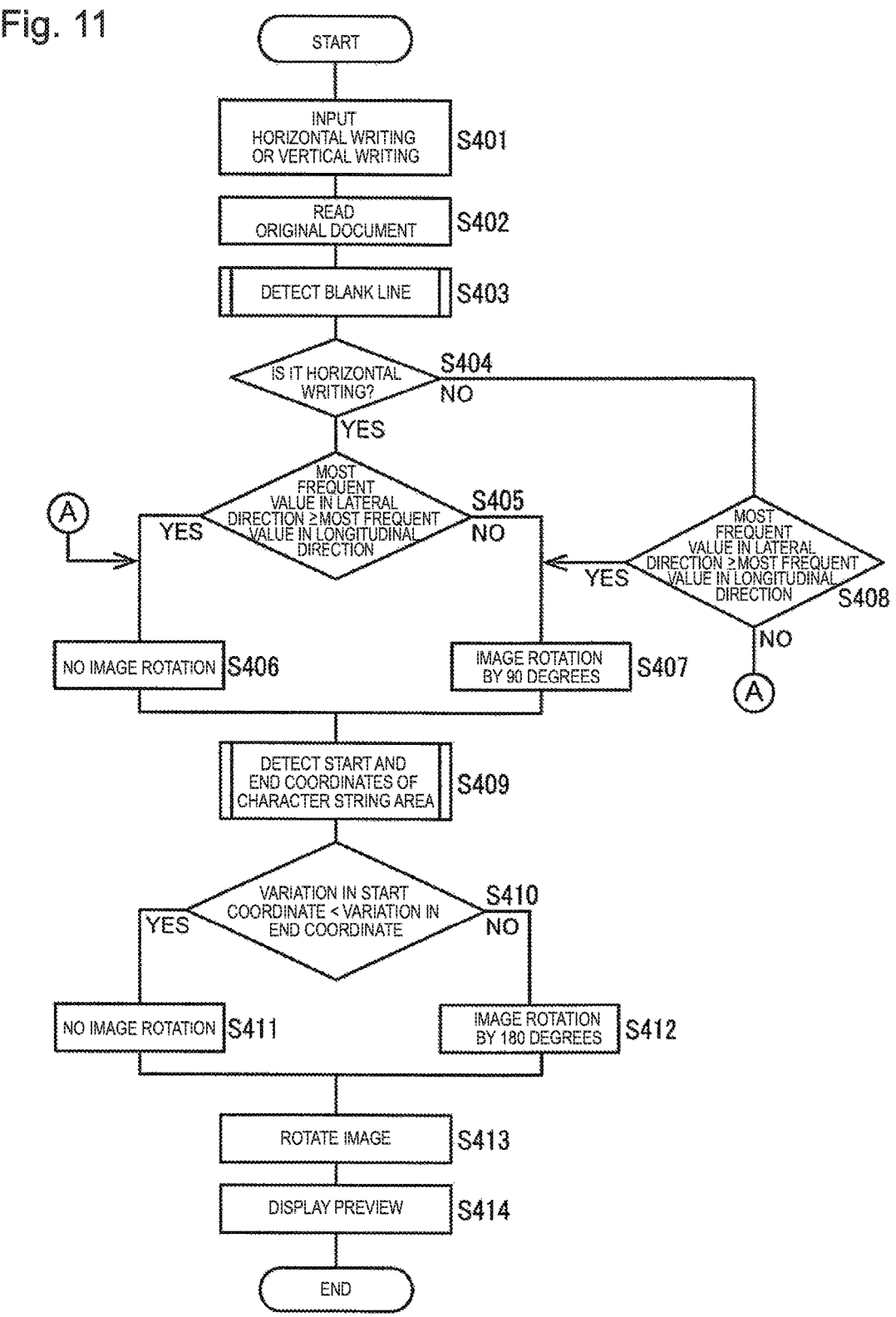
FIG. 11 is a flowchart illustrating a procedure of the original document orientation determination processing according to a second embodiment.

The original document orientation determination processing performed by the image formation apparatus according to this embodiment is described by referring to FIGS. 1 and 2, following the steps indicated by characters S in the flowchart in FIG. 11 illustrating the procedure of an original document orientation determination processing according to the second embodiment.

S401: First, the user performs an input operation with operation unit 101 to designate whether the characters on the original document to be scanned by image formation apparatus 10 are horizontally written (horizontally written in the original document) or vertically written (vertically written in the original document), and operation unit 101 receives the input operation by the user. Here, the horizontally written original document is an original document on which character strings are arranged to extend in the lateral direction, and the vertically written original document is an original document on which character strings are arranged to extend in the longitudinal direction.

Next, the user places the original document with characters written thereon onto original document placement table 1028 or ADF 1029 of scanner 102 of image formation apparatus 10 and operates operation unit 101 to start scanning the original document, and image formation apparatus 10 starts scanning the original document.

S402: Image capturing device 1020 of scanner 102 scans (captures) the original document and generates the image data of the original document.

S403: Color determiner 1021 determines the colors of pixels of the image data of the original document scanned by image capturing device 1020. Blank line determiner 1022 performs a blank line detection processing that detects blank lines in both the longitudinal and lateral directions of the image data by determining whether or not a blank line is present based on the colors determined by color determiner 1021. Note that this blank line detection processing is the processing as illustrated in FIG. 4.

S404: Horizontal direction determiner 1024 determines which of the horizontal writing and vertical writing is inputted at S401. If horizontal direction determiner 1024 determines that horizontal writing is inputted, it moves the processing to S405, and if it determines that vertical writing is inputted, it moves the processing to S408.

S405: Horizontal direction determiner 1024, which has determined that horizontal writing is inputted, obtains the occurrence frequency of the number of blank lines that appear continuously (the number of lines in a blank line group) in both the longitudinal and lateral directions, and compares the most frequent value in the lateral direction and that in the longitudinal direction. If horizontal direction determiner 1024 determines that the most frequent value in the lateral direction is larger than or equal to that in the longitudinal direction, it judges that the character strings extend in the lateral direction, and moves the processing to S406 because no rotation of the image data is necessary. If it determines that the most frequent value in the longitudinal direction is larger than that in the lateral direction, it judges that character strings extend in the longitudinal direction, and moves the processing to S407 to rotate the image data.

For example, as illustrated in FIGS. 12A and 12B, horizontal direction determiner 1024 calculates as follows. In the case where there are six blank line groups in the lateral lines (lateral direction), and a group of 4 blank lines appears "2 times (frequencies)"; a group of 5 blank lines, "4 times (frequencies)"; a group of 6 blank lines, "6 times (frequencies)"; a group of 7 blank lines, "10 times (frequencies)"; a group of 8 blank lines, "5 times (frequencies)"; and a group of 9 blank lines, "3 times (frequencies)", the most frequent value of blank lines in the lateral direction is "7".

In the case where there are six blank line groups in the longitudinal lines (longitudinal direction), and a group of 1 blank line appears "2 times (frequencies)"; a group of 2 blank lines, "3 times (frequencies)"; a group of 3 blank lines, "8 times (frequencies)"; a group of 4 blank lines, "7 times (frequencies)"; a group of 5 blank lines, "4 times (frequencies)"; and a group of 6 blank lines, "2 times (frequencies)", the most frequent value of blank lines in the longitudinal direction is "3".

In this case, horizontal direction determiner 1024 determines that the most frequent value in the lateral direction is larger than or equal to that in the longitudinal direction, and detects that the extension direction of the line space between the adjacent character strings extend in the lateral direction.

As described above, horizontal direction determiner 1024 detects the extension direction of the line space between the adjacent character strings based on the most frequent values of the blank line group of continuous blank lines.

S406: Horizontal direction determiner 1024 takes it that no rotation of the image data is necessary because the detected direction of character strings is the same as that inputted at S401, and moves the processing to S409.

S407: Horizontal direction determiner 1024 takes it that rotating the image data by 90 degrees (clockwise 90 degree, for example) is necessary because the detected direction of character strings is different from that inputted at S401, and moves the processing to S409.

As described above, horizontal direction determiner 1024 determines whether or not a rotation of the image data is necessary based on the detected extension direction of the line spaces between the adjacent character strings and the direction of character strings inputted at S401.

S408: Horizontal direction determiner 1024, which has determined at S404 that vertical writing is inputted, obtains the occurrence frequency of the number of blank lines that appear continuously (the number of lines in a blank line group) in both the longitudinal and lateral directions, and compares the most frequent value in the lateral direction and that in the longitudinal direction. If horizontal direction determiner 1024 determines that the most frequent value in the lateral direction is larger than or equal to that in the longitudinal direction, it judges that character strings extend in the lateral direction, and moves the processing to S407 to rotate the image data. If it determines that the most frequent value in the longitudinal direction is larger than that in the lateral direction, it judges that character strings extend in the longitudinal direction and moves the processing to S406 because no rotation of the image data is necessary.

Note that, as illustrated in FIG. 9, the first group and the last group in the blank line groups are often simply the marginal areas. Accordingly, in order to exclude the marginal areas, areas in which the number of blank lines is much larger (for example, larger by a predetermined number) than the average among the blank line groups are excluded from each group's most frequent value which is to be checked.

S409 to S414: Processing is the same as that from S106 to S111 illustrated in FIG. 3. Accordingly, descriptions thereof are omitted.

In addition, since blank line detection processing and character string area detection processing are the same as those in the first embodiment, descriptions thereof are omitted.

As described above, in this embodiment, since operation unit 101 receives an input operation indicating whether characters on the original document are horizontally written (horizontally written original document) or vertically written (vertically written original document), it is possible to automatically determine the orientation of the original document scanned by image capturing device 1020 for either of horizontally written original documents or vertically written original documents.

Moreover, since horizontal direction determiner 1024 compares the most frequent value in the lateral direction and that in the longitudinal direction of the number of blank lines that appear continuously (the number of lines in a blank line group) and determines the direction in which the most frequent value is larger (the direction in which the number of lines in a blank line group is larger) as being the extension direction of the line spaces between the adjacent character strings, it is possible to positively determine the extension direction of the line spaces between the adjacent character strings, even in the case where there is not a distinct difference in the levels of variation in the number of blank lines that appear continuously.

In other words, even for an original document in which almost the same number of blank lines between characters appears repeatedly (an original document in which the same size of characters are arranged with the same intervals), it is possible to detect blank lines between character strings and positively determine the extension direction of each of the character strings.

As has been described above, in the second embodiment in addition to the effect of the first embodiment, the effect can be obtained which makes it possible to automatically determine the orientation of an original document scanned by the image capturing device for both horizontally written original documents and vertically written original documents.

Moreover, even for an original document in which almost the same number of blank lines between characters appears repeatedly, it is possible to detect the number of lines between character strings, and the effect can be obtained which makes it possible to positively detect the extension direction of the character strings.

Note that although in the first and second embodiments, descriptions have been provided assuming that the image formation apparatus includes a scanner and a printer, the invention is not limited thereto and may be applicable to a scanner apparatus without a printer, a facsimile apparatus, a multifunctional printer (MFP), and other apparatuses.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:
   an image capturing device that reads an original document and generates image data of the original document;
   a processor configured with a program to perform operations comprising:
   operation as a color determiner that determines a color of a pixel of the image data;
   operation as a blank line determiner that detects blank lines extending in a main scan direction and blank lines extending in a sub-scan direction orthogonal to the main scan direction in the image data based on the color of the pixel determined by the operation as the color determiner;
   operation as a parallel direction determiner that determines an extension direction of a line space between adjacent character strings on the original document, based on a comparison between the blank lines extending in the main scan direction and the blank lines extending in the sub-scan direction;
   operation as a character string area determiner that detects a start position and an end position of each of the character strings extending along the determined extension direction; and
   operation as an orthogonal direction determiner that determines an orientation of the original document based on the start position and the end position of each of the character strings.

2. The image formation apparatus according to claim 1, wherein the processor is configured by the program to perform operations further comprising
   operation as an image rotator that rotates the image data based on the extension direction of the line space between the adjacent character strings determined by operation as the parallel direction determiner, and the orientation of the original document determined by operation as the orthogonal direction determiner.

3. The image formation apparatus according to claim 1, wherein the processor is configured by the program to perform operations such that
   operation as the blank line determiner determines, as the blank line, a pixel line in which only pixels determined to be white by operation as the color determiner are lined, or a pixel line formed of pixels a color of which has been determined not to be white by operation as the color determiner and in which pixels in the color are not lined continuously over a predetermined number.

4. The image formation apparatus according to claim 1, wherein the processor is configured by the program to perform operations such that
   operation as the parallel direction determiner determines the extension direction of the line space between the adjacent character strings based on a comparison between the blank lines extending in the main scan direction and the blank lines extending in the sub-scan direction about a level of variation in the number of pixel lines in which the blank lines continue in a direction orthogonal to each of the blank lines.

5. The image formation apparatus according to claim 1, wherein the processor is configured by the program to perform operations such that
   operation as the parallel direction determiner determines the extension direction of the line space between the adjacent character strings based on a comparison between the blank lines extending in the main scan direction and the blank lines extending in the sub-scan direction about a most frequent value of the number of pixel lines in which the blank lines continue in a direction orthogonal to each of the blank lines.

6. The image formation apparatus according to claim 5, wherein the processor is configured by the program to perform operations further comprising
   operation as an operation unit that receives a user input to designate which of a horizontally written original document and a vertically written original document the original document to be read by the image capturing device is, wherein
   operation as the parallel direction determiner determines whether rotation of the image data is necessary based on the extension direction of each of the line space between the adjacent character strings and the designation.

7. The image formation apparatus according to claim 1, wherein the processor is configured by the program to perform operations such that
   operation as the character string area determiner determines a leading pixel of a pixel line in which pixels a color of which has been determined not to be white by operation as the color determiner and in which pixels in the color are lined continuously over a predetermined number as the start position of the character string.

8. The image formation apparatus according to claim 7, wherein the processor is configured by the program to perform operations such that
   after determining the start position of the character string and when detecting a pixel in a color different from the color of the pixels of the character string, operation as the character string area determiner determines a last pixel of the character string as the end position of the character string.

9. The image formation apparatus according to claim 1, wherein the processor is configured by the program to perform operations such that operation as the orthogonal direction determiner detects the orientation of the original document based on a level of variation in the start position and the end position.

10. An image processing method performed by a processor of an image processing apparatus, comprising:
    determining a color of a pixel of an image data of an original document read by an image capturing device;
    detecting blank lines extending in a main scan direction and blank lines extending in a sub-scan direction orthogonal to the main scan direction in the image data based on the determined color of the pixel;
    determining an extension direction of a line space between adjacent character strings on the original document, based on a comparison between the blank lines extending in the main scan direction and the blank lines extending in the sub-scan direction;
    detecting a start position and an end position of each of the character strings extending along the determined extension direction; and
    determining an orientation of the original document based on the start position and the end position of each of the character strings.

11. The image processing method according to claim 10, further comprising
    rotating the image data based on the determined extension direction of the line space between the adjacent character strings and the determined orientation of the original document.

12. The image processing method according to claim 10, wherein
    detecting the blank lines extending in the main scan direction and blank lines extending in the sub-scan direction orthogonal to the main scan direction in the image data comprises determining, as the blank line, a pixel line in which only pixels determined to be white are lined, or a pixel line formed of pixels a color of which has been determined not to be white and in which pixels in the color are not lined continuously over a predetermined number.

13. The image processing method according to claim 10, wherein
    determining the extension direction of the line space between adjacent character strings on the original document, based on the comparison between the blank lines extending in the main scan direction and the blank lines extending in the sub-scan direction, comprises determining the extension-direction of the line space between the adjacent character strings based on a comparison between the blank lines extending in the main scan direction and the blank lines extending in the sub-scan direction about a level of variation in the number of pixel lines in which the blank lines continue in a direction orthogonal to each of the blank lines.

14. The image processing method according to claim 10, wherein
    determining the extension direction of the line space between adjacent character strings on the original document, based on the comparison between the blank lines extending in the main scan direction and the blank lines extending in the sub-scan direction, comprises determining the extension direction of the line space between the adjacent character strings based on a comparison between the blank lines extending in the main scan direction and the blank lines extending in the sub-scan direction about a most frequent value of the number of pixel lines in which the blank lines continue in a direction orthogonal to each of the blank lines.

15. The image processing method according to claim 14, wherein further comprising
    receiving a user input to designate which of a horizontally written original document and a vertically written original document the original document to be read by the image capturing device is, wherein
    determining the extension direction of the line space between adjacent character strings on the original document, based on the comparison between the blank lines extending in the main scan direction and the blank lines extending in the sub-scan direction, comprises determining whether rotation of the image data is necessary based on the extension direction of each of the line space between the adjacent character strings and the designation.

16. The image processing method according to claim 10, wherein
    detecting the start position and the end position of each of the character strings extending along the determined extension direction comprises determining a leading pixel of a pixel line in which pixels a color of which has been determined not to be white and in which pixels in the color are lined continuously over a predetermined number as the start position of the character string.

17. The image processing method according to claim 16, wherein
    detecting the end position of each of the character strings extending along the determined extension direction comprises determining a last pixel of the character string as the end position of the character string, when detecting a pixel in a color different from the color of the pixels of the character string after determining the start position of the character string.

18. The image processing method according to claim 10, wherein
    determining the orientation of the original document based on the start position and the end position of each of the character strings comprises detecting the orientation of the original document based on a level of variation in the start position and the end position.

* * * * *